United States Patent [19]

Takahashi

[11] Patent Number: 5,369,632
[45] Date of Patent: Nov. 29, 1994

[54] DISC WITH PREVENTION OF STATIC ELECTRIC CHARGE BUILD-UP

[75] Inventor: Kenji Takahashi, Miyagi, Japan

[73] Assignee: Sony Corporation, Japan

[21] Appl. No.: 928,348

[22] Filed: Aug. 12, 1992

[30] Foreign Application Priority Data

Aug. 16, 1991 [JP] Japan .................. 3-229686

[51] Int. Cl.⁵ .................................. G11B 3/70
[52] U.S. Cl. .................... 369/282; 369/290; 369/270
[58] Field of Search ............ 369/27, 271, 290, 282; 360/99.12

[56] References Cited

U.S. PATENT DOCUMENTS

| | | | |
|---|---|---|---|
| 4,532,622 | 7/1985 | Newbold | 369/270 |
| 4,612,271 | 9/1986 | Makino et al. | 430/72 |
| 4,629,672 | 12/1986 | Makino et al. | 430/76 |
| 4,647,521 | 3/1987 | Oguchi et al. | 430/58 |
| 4,787,009 | 11/1988 | Takahashi | 369/290 |
| 4,789,974 | 12/1988 | Satoh et al. | 369/45 |
| 4,829,510 | 2/1988 | Takahashi | 369/290 |
| 4,860,278 | 8/1989 | Nakahara | 369/271 |
| 4,937,119 | 6/1990 | Nikles et al. | 428/64 |
| 5,034,934 | 7/1991 | Naito et al. | 369/13 |
| 5,047,881 | 9/1991 | Uehara | 360/99.12 |
| 5,063,129 | 11/1991 | Yokoya et al. | 430/83 |
| 5,087,699 | 2/1992 | Nagai | 546/296 |
| 5,226,033 | 7/1993 | Takahashi | 369/290 |

FOREIGN PATENT DOCUMENTS 0034784 2/1988 Japan .................. 369/282

OTHER PUBLICATIONS

"Modern Plastics Encyclopedia '92", Oct. 1991, pp. 208–210 & 400–401.

Primary Examiner—Richard A. Bertsch
Assistant Examiner—Alfred Basichas
Attorney, Agent, or Firm—Ronald P. Kananen

[57] ABSTRACT

An inner peripheral resin ring having a centering aperture unitarily molded with the inner periphery of a metal plate of a disc hub is given an anti-static effect to prevent build-up of a static electric charge. An inner peripheral resin ring (14) having on its center a centering aperture (17) unitarily molded with the inner periphery of the metal plate (12) of a disc hub (11) is formed by the molding process of a resin which is highly wear-resistant and relatively conductive.

12 Claims, 5 Drawing Sheets

DISC WITH PREVENTION OF STATIC ELECTRIC CHARGE BUILD-UP

BACKGROUND OF THE INVENTION

1. Field of the Invention

The present invention relates to a disc used as a recording medium on which there are recorded various kinds of information signals and, more particularly, to a disc of a type such that the disc is chucked to a spindle in a magnet-chucking fashion.

2. Description of the Prior Art

Optical discs such as a magneto-optical disc or the like have long been known as a recording medium on which there are recorded various kinds of information signals.

As an optical disc that is chucked to a disc rotating spindle of an optical disc recording and reproducing apparatus in a so-called magnet-chucking fashion, the assignee of the present application has previously proposed Japanese Utility Model Application No. 62-199240 (Japanese Laid-Open Utility Model Publication No. 1-107072), etc.

An outline of this conventional optical disc will be described with reference to FIGS. 1 to 3.

As illustrated, an optical disc 1 generally depicted by reference numeral 1 is comprised of a disc body 2 and a disc hub 5 having a resin ring 4 unitarily molded with a circumferential edge portion of a metal plate 3. The disc body 2 has a disc-shaped configuration and is made by molding a synthetic resin, e.g., polycarbonate resin. One or both surfaces of the disc body 2 are used as recording surfaces in which recording tracks are formed in the circumferential direction thereof. A circular central aperture 2a is bored through a central portion of the disc body 2 as shown in FIG. 2.

The metal plate 3 of the disc hub 5 is formed as a disc from a magnetic material such as an iron plate or the like. A centering aperture 6 whose diameter is smaller than that of the central aperture 2a of the disc body 2 is coaxially bored through the central portion of the metal plate 3 of the disc hub 5. Then, the resin ring 4 is unitarily molded with the circumferential edge portion of the metal plate 3 by a so-called outsert molding method, thereby constructing the disc hub 5.

An annular welding rib 7, which is used to weld the disc hub 5 to the disc body 2, is formed on the resin ring 4 on its surface opposing the disc body 2. Further, a plurality of guide ribs 8 having a leg-piece configuration, are fitted to the inner circumferential surface of the central aperture 2a of the disc body 2, and project from the inner circumferential portion of the resin ring 4.

When the disc hub 5 is attached to the disc body 2, the resin ring 4 is located on the surface of the disc body 2 in such a manner that the welding rib 7 thereof opposes the surface of the disc body 2 while the guide ribs 8 are fitted into the inner circumferential surface of the central aperture 2a. If an ultrasonic horn (not shown) is pressed on the resin ring 4 and an ultrasonic vibration is applied to the resin ring 4 during a predetermined period of time under that state, then the welding rib 7 becomes molten to weld the disc hub 5 to the disc body 2.

In this fashion, the disc hub 5 is attached to the disc body 2 in a so-called centering fashion such that the centering aperture 6 of the metal plate 3 accurately coincides with the center of the recording tracks on the disc body 2. While the disc hub 5 is welded onto the upper surface of the disc body 2 as shown in FIG. 2, the disc hubs 5 are welded onto both upper and lower surfaces of the disc body 2 in actual practice.

The optical disc 1 thus arranged is generally preserved under conditions wherein it is accommodated within a disc cartridge. When the optical disc 1 is loaded onto an optical disc recording and reproducing apparatus, the centering aperture 6 of the disc hub 5 is inserted into a spindle S made of a metallic material such as a stainless steel or the like and is thereby positioned. Also, the metal plate 3 of the disc hub 5 is chucked in a magnetic-chucking fashion to a disc table T which is provided at the outer periphery of the spindle S and around which there is embedded an annular magnet (not shown). Then, when the optical disc 1 is rotated by the spindle S, various information may be recorded on and reproduced from the optical disc 1 by means of an optical pickup (not shown).

However, because the spindle S is made from a metallic material, the conventional optical disc 1, in which the centering aperture 6 of the disc hub 5 is directly bored through the metal place 3, tends to produce very small metal powders when the metal plate 3 and the metal spindle S wear against each other during the magnetic-chucking process.

Also, because the spindle S must locate the optical disc 1 with high accuracy, a difference between the outer diameter of the spindle S and the inner diameter of the centering aperture 6 is generally set to a value as small as about 12 $\mu$m.

Accordingly, if the inside of the centering aperture 6 and the surface on which the metal plate 3 is chucked to the disc table T are smudged by metal powders produced due to wear, then the normal chucking operation of the optical disc 1 to the spindle S may be hindered. If the optical disc 1 is rotated under the condition wherein the optical disc 1 is imperfectly chucked to the spindle S, then the optical disc 1, the disc hub 5, the spindle S, the optical pickup or the like will be damaged.

To solve the above problem, the assignee of the present invention has previously proposed a disc wherein a unitarily-molded inner peripheral resin ring is formed on the inner periphery of a metal plate of a disc hub by a wear-proof resin and a centering aperture is formed at the center of the inner peripheral resin ring, thereby preventing metal powders from being produced when the metal plate is subject to wear.

However, after the above disc has been in use for a long period of time, the centering aperture which is bored through the inner peripheral resin ring (made of the wear-proof resin) becomes worn by a very small amount, which unavoidably produces wearing powders. In addition, since the inner peripheral resin ring is made of resin, the inner peripheral resin ring tends to become charged with static electricity. Recent studies have revealed that, due to the static electricity charged, the inside of the centering aperture or the like tends to adsorb the above wearing powders, dust or the like, which hinders the normal chucking operation of the disc onto the spindle.

OBJECTS AND SUMMARY OF THE INVENTION

Therefore, it is an object of the present invention to provide an improved disc in which the aforesaid shortcomings and disadvantages encountered with the prior art can be eliminated.

More specifically, it is an object of the present invention to provide a disc in which an inner peripheral resin ring can be given an anti-static effect for static electricity.

It is another object of the present invention to provide a disc in which the disc can correctly and smoothly be chucked to a spindle constantly.

According to an aspect of the present invention, an inner peripheral resin ring having formed on its center a centering aperture is unitarily molded outs the inner periphery of a metal plate of a disc hub. The ring is formed by a molding process from a resin which is highly wear resistant and sufficiently conductive to avoid a build-up of static electric charge.

In accordance with a disc according to the present invention, since the inner peripheral resin ring is formed by the molding process from a highly wear resistant and conductive resin, the inner peripheral resin ring can be prevented from becoming charged by static electricity.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
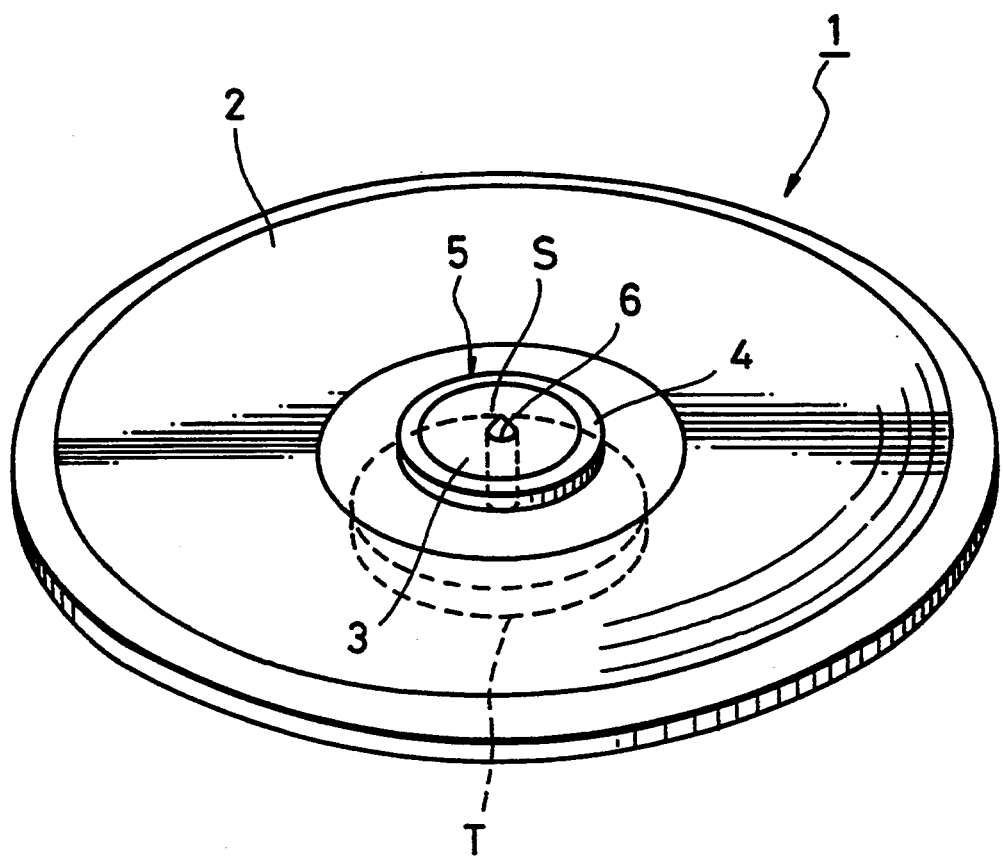
FIG. 1 is a perspective view illustrating a conventional optical disc.
Figure 2:
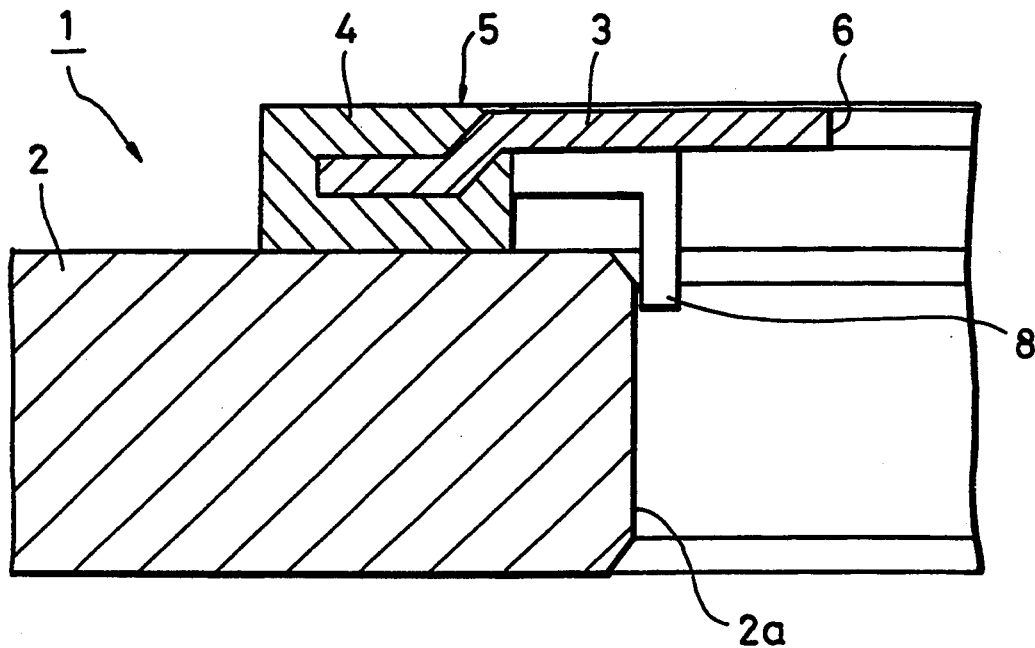
FIG. 2 is a fragmentary cross-sectional view illustrating a main portion of the conventional optical disc.
Figure 3:
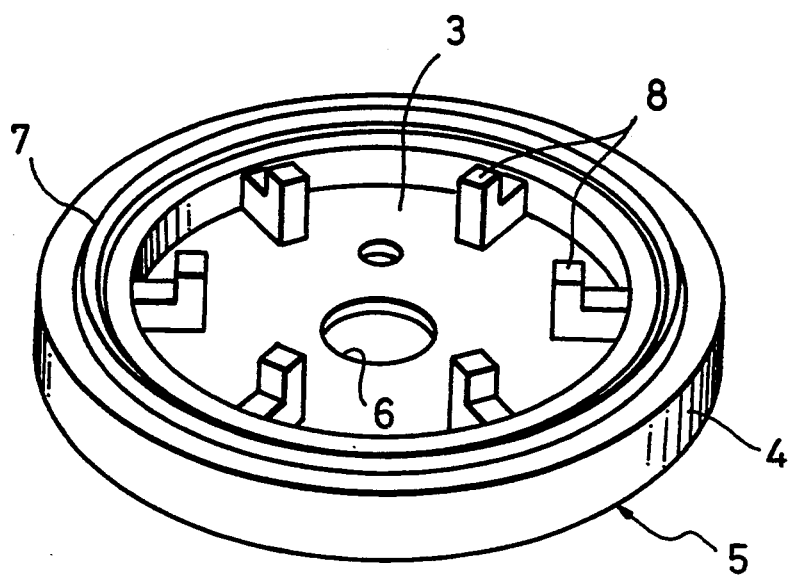
FIG. 3 is a perspective view illustrating a conventional disc hub from the bottom surface side thereof.
Figure 4:
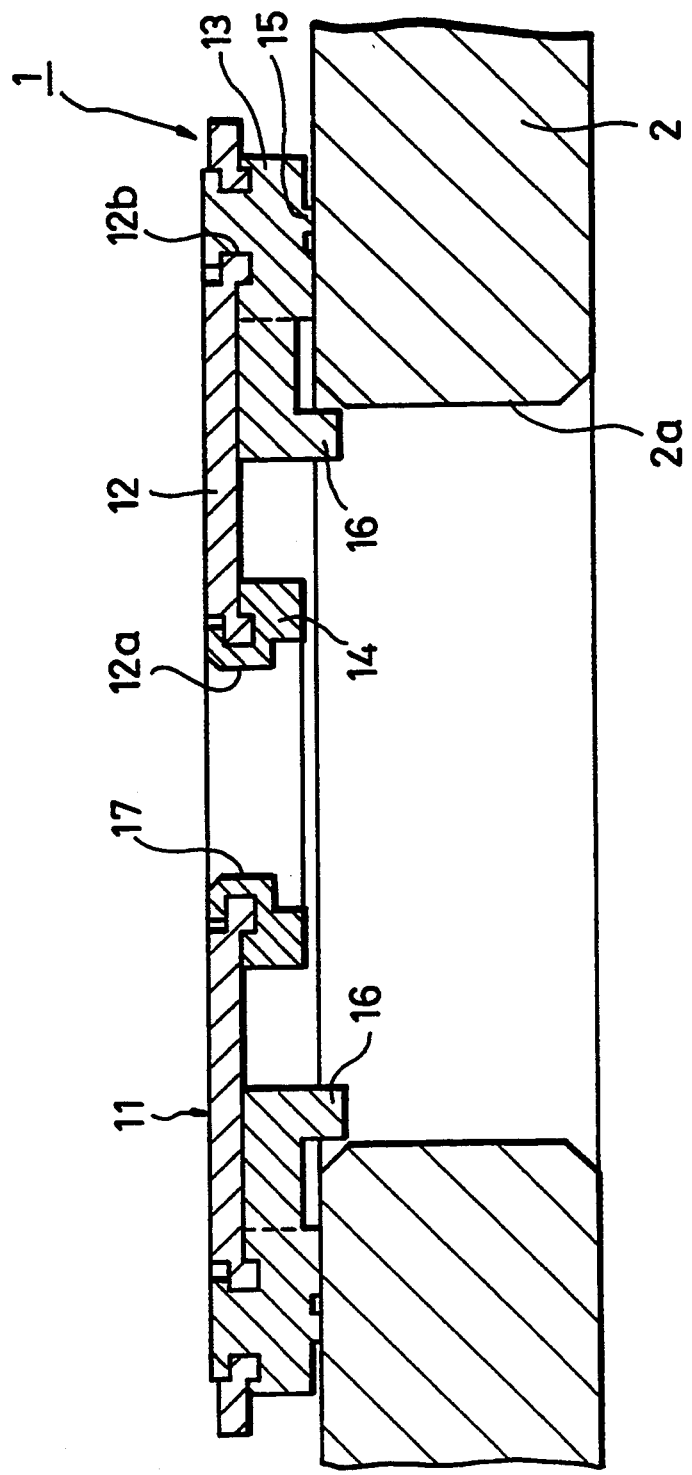
FIG. 4 is a cross-sectional side view illustrating a main portion of an optical disc according to an embodiment of the present invention.
Figure 5:
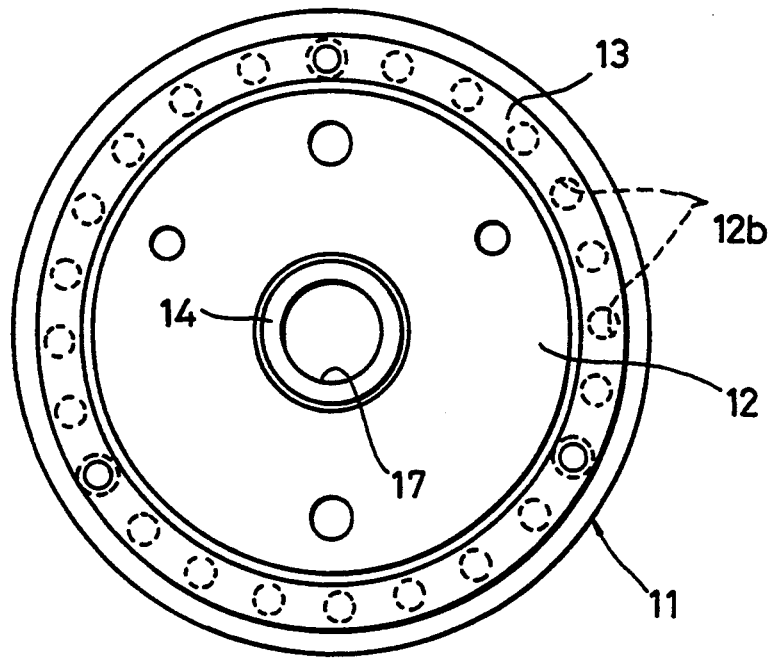
FIG. 5 is a plan view of a disc hub of the optical disc according to the present invention.
Figure 6:
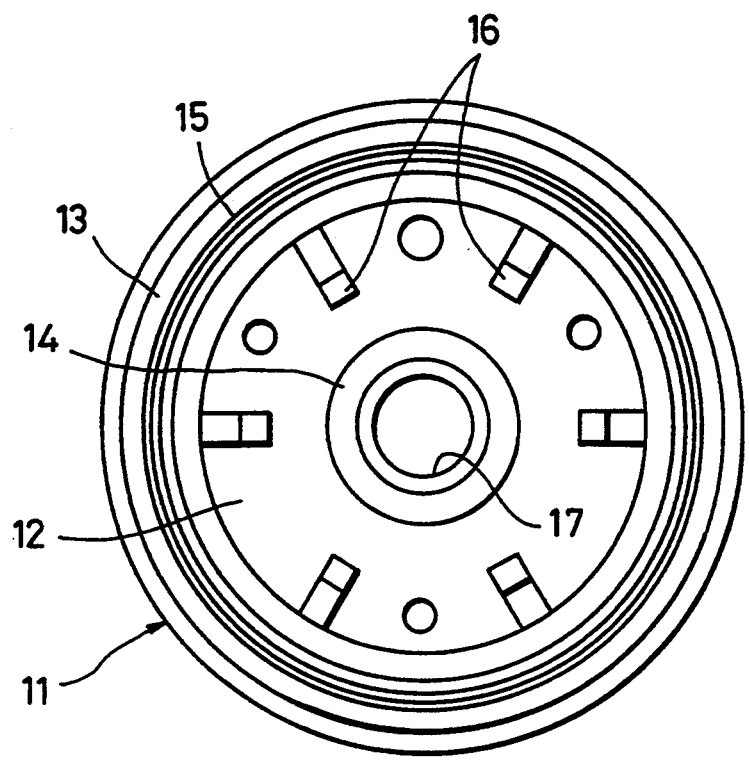
FIG. 6 is a bottom view of the disc hub of the optical disc according to the present invention.
Figure 7:
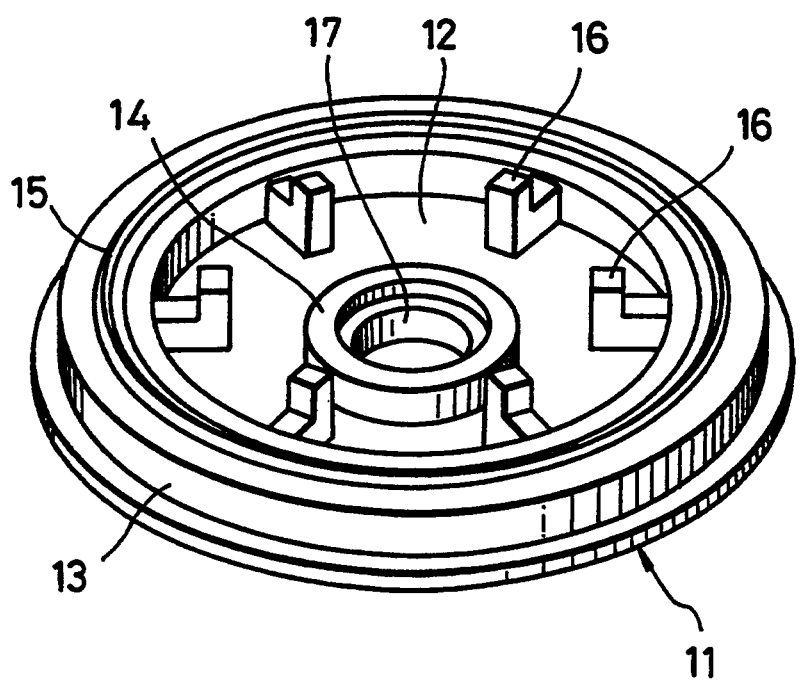
FIG. 7 is a perspective view illustrating the disc hub of the above optical disc from the bottom surface side thereof.

A disc according to an embodiment of the present invention will now be described with reference to FIGS. 4 to 7, in which parts identical to those of FIGS. 1 to 3 are marked with the same references and need not be described in detail.

As illustrated, a disc hub 11 an the optical disc 1 according to the present invention, comprises a metal plate 12, an outer peripheral resin ring (hereinafter simply referred to as "outer peripheral ring") 13 unitarily formed with the outer periphery side of the metal plate 12 and an inner peripheral resin ring (hereinafter simply referred to as an "inner peripheral ring") 14 unitarily formed with the inner peripheral side of the metal plate 12.

The metal plate 12 is formed as a disc from an iron plate, for example, and has a central aperture 12a is bored through the central portion thereof. The outer peripheral ring 13 is unitarily formed with the metal plate 12 around its outer peripheral side by a so-called outsert molding method. In other words, the outer peripheral ring 13 is formed over both surfaces of the metal plate 12 by way of a plurality of through-holes 12b bored through the metal plate 12. A rib 15 of annular configuration, which is used to weld the disc hub 11 to the disc body 2, is formed on the outer peripheral ring 13 on its surface which opposes the disc body 2. A plurality of leg-shaped guide ribs 16, which are fitted into the central aperture 2a of the disc body 2, projected from the inner peripheral surface of this outer peripheral ring 13.

The outer peripheral ring 13 is made of a resin having an excellent bonding property (welding property) with respect to the disc body 2. In this embodiment, because the disc body 2 is made of a polycarbonate resin, the outer peripheral ring 13 is molded from the same polycarbonate resin.

The inner peripheral ring 14 is unitarily molded with the central aperture 12a of the metal plate 12, preferably by means of an outsert molding method, and a centering aperture 17, into which a disc rotating spindle (not shown) is inserted, is bored through the center of the inner peripheral ring 14. That is, according to this embodiment, the centering aperture 17 in the disc hub 11, which is used for positioning the disc in use, is formed by means of the inner peripheral ring 14.

The inner peripheral ring 14 is made of a resin whose surface specific resistance is less than $10^{14} \Omega$ by filling a conductive material such as a carbon fiber or the like into a resin having a high wear-resistance property and excellent electrical conductivity, such as a polyacetal resin, a polycarbonate resin containing fluorine or the like.

Although the wear-resistance property of the inner peripheral resin 14 can be improved by filling fluorine into the polycarbonate resin, for example, with a mixing amount of 10 to 20% or more, the resultant polycarbonate resin presents a surface specific resistance of $10^{16} \Omega$ or more so that it does not have high enough conductivity to prevent a static electricity charge thereon.

Therefore, by mixing a conductive material such as a carbon fiber or the like into a polycarbonate resin containing about 5 to 30% fluorine the surface specific resistance of the resin, which is inherently an insulating material, is made less than $10^{14} \Omega$. Thereby the conductivity of the resin is sufficient to produce an anti-static electric charge build-up effect.

Further, mold shrinkage ratio of resin is lowered by filling a conductive material, such as carbon fiber or the like, into the resin. Hence, dimensional stability of the centering aperture 17 can be improved. In this case, because the dimensional accuracy of the centering aperture 17 must fall in a range of $\pm 3$ to 4 $\mu$m, it is desirable that the mold shrinkage ratio of the resin be as small as possible. From this standpoint, a polycarbonate resin is preferable to a polyacetal resin.

The outer and inner rings 13 and 14 are preferably molded by means of a so-called double outsert molding method in which the outer peripheral ring 13 and the inner peripheral ring 14 are molded on the metal plate 12 by a series of molding processes using a conventional dichromatic molding method.

When the thus arranged disc hub 11 is attached to the disc body 2, the outer peripheral ring 13 opposes, on its surface on which the welding rib 15 is formed, the disc body 2, and the guide ribs 16 engage the central aperture 2a. Then, the disc hub 11 is positioned on the disc body 2 whereby the guide ribs 16 are brought into sliding contact with the inner peripheral surface of the central aperture 2a. In this state, when an ultrasonic horn (not shown) is positioned over the outer peripheral ring 13 to apply ultrasonic vibration to the outer peripheral ring 13 for a predetermined period of time, the welding rib 15 becomes molten to thereby weld the disc hub 11 to the disc body 2.

Since the inner peripheral ring 14 of the thus arranged optical disc 1 is molded using a resin which is highly wear-resistant and conductive, the spindle and the centering aperture 17 can be prevented from wearing against each other as much as possible when the centering aperture 17 is inserted into the spindle. In addition, the inner peripheral ring 14 can achieve an anti-static electric charge effect, thereby making it possible to prevent a static electric charge from building up on the inner peripheral ring 14.

Therefore, wear powders, produced when the centering aperture 17 of the inner peripheral ring 14 becomes slightly worn over a long period of use, and dust which may gather around the centering aperture 17 or the like, can be prevented from being attracted into the centering aperture 17 by a static electricity charge.

Consequently, hindrance of the normal chucking operation of the optical disc 1 to the spindle resulting from wear powders and dust around the centering aperture 17 may be prevented and hence the optical disc 1 can be constantly and correctly chucked to the spindle in a magnetic-chucking fashion. Therefore, it is possible to prevent the optical disc 1, the disc hub 11, the spindle, the optical pickup or the like from being damaged, such as may occur when the optical disc 1 is rotated under the conditions wherein the optical disc 1 is imperfectly chucked to the spindle.

Since the disc of the present invention is constructed as described above, the following effects can be achieved.

Since the disc hub includes the inner peripheral resin ring having the centering aperture molded using a resin which is highly wear-resistant and sufficiently conductive to provide the inner peripheral resin ring with an anti-static effect in terms of static electricity, hindrance of the chucking operation of the disc to the spindle resulting from wear powders from the inner peripheral resin ring, or dust or the like attracted into the centering aperture by a static electricity charge on the inner peripheral resin ring, can be presented. Therefore, the disc can constantly, correctly and smoothly be chucked to the spindle in a magnet-chucking fashion.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A disc having a disc body and adapted to be mounted on a spindle, said disc further comprising:
   a disc hub including a magnetic-chucking plate formed of a ferrous material;
   an outer peripheral ring bonded to said disc body and adapted to hold said chucking plate to thereby attach said chucking plate to said disc body;
   an inner ring molded onto an inner circumference of said chucking plate, and having a centering aperture formed therein for mounting said disc on said spindle, said inner ring being made of a wear-resistant resin having sufficient conductivity to effectively prevent a static electric charge build-up thereon.

2. The disc according to claim 1, wherein said metal plate is disc-shaped.

3. The disc according to claim 1 wherein said outer peripheral ring is formed on an outer circumference of said metal plate.

4. The disc according to claim 1, wherein said inner ring is formed by an outsert molding process.

5. The disc according to claim 4, wherein said inner peripheral ring is made of a polycarbonate resin.

6. The disc according to claim 3, wherein said outer ring further comprises an annular welding rib formed on its surface which opposes said disc body.

7. The disc according to claim 6, wherein said welding rib is operable to weld said disc hub to said disc body upon application of ultrasonic vibration.

8. The disc according to claim 1, wherein said resin is made by mixing a conductive material with a conductive wear-resistant resin having a high degree of wear resistance.

9. The disc according to claim 8, wherein said conductive material is a carbon fiber.

10. The disc according to claim 8, wherein said conductive resin having a high degree of wear resistance is polyacetal resin or polycarbonate resin containing fluorine.

11. The disc according to claim 8, wherein said resin has a surface specific resistance of less than $10^{14}\Omega$.

12. The disc according to claim 8, wherein said conductive material comprises in the range of about 5 to 30% of said resin.

* * * * *